United States Patent
Thyrvin et al.

(10) Patent No.: US 12,367,991 B2
(45) Date of Patent: Jul. 22, 2025

(54) AC SUBMARINE POWER CABLE WITH REDUCED LOSSES

(71) Applicant: NKT HV Cables AB, Lyckeby (SE)

(72) Inventors: Ola Thyrvin, Karlskrona (SE);
Andreas Persberg, Karlskrona (SE);
Andreas Tyrberg, Lyckeby (SE);
Håkan Sandell, Karlskrona (SE)

(73) Assignee: NKT HV Cables AB, Lyckeby (SE)

( * ) Notice: Subject to any disclaimer, the term of this patent is extended or adjusted under 35 U.S.C. 154(b) by 0 days.

(21) Appl. No.: 17/757,612

(22) PCT Filed: Dec. 18, 2020

(86) PCT No.: PCT/EP2020/087309
§ 371 (c)(1),
(2) Date: Jun. 17, 2022

(87) PCT Pub. No.: WO2021/123373
PCT Pub. Date: Jun. 24, 2021

(65) Prior Publication Data
US 2023/0019405 A1    Jan. 19, 2023

(30) Foreign Application Priority Data

Dec. 19, 2019 (EP) ..................................... 19218059

(51) Int. Cl.
*H01B 7/20*    (2006.01)
*H01B 7/14*    (2006.01)
*H01B 7/282*    (2006.01)
*H01B 7/288*    (2006.01)
*H01B 9/00*    (2006.01)

(52) U.S. Cl.
CPC ............. *H01B 7/2825* (2013.01); *H01B 7/14* (2013.01); *H01B 7/207* (2013.01); *H01B 7/288* (2013.01); *H01B 9/00* (2013.01)

(58) Field of Classification Search
CPC .... H01B 7/0869; H01B 7/207; H01B 7/2806; H01B 9/027
See application file for complete search history.

(56) References Cited

U.S. PATENT DOCUMENTS 5,010,209 A * 4/1991 Marciano-Agostinelli .................. H01B 9/02
174/23 C
9,058,917 B2 * 6/2015 Koelblin .............. H01B 7/2825
(Continued)

FOREIGN PATENT DOCUMENTS

| EP | 2312591 A1 | 4/2011 |
| EP | 2706539 B1 | 1/2019 |

(Continued)

OTHER PUBLICATIONS

"SAE steel grades", Wikipedia, 8 pages, Oct. 23, 2012.*
(Continued)

*Primary Examiner* — Chau N Nguyen
(74) *Attorney, Agent, or Firm* — Whitmyer IP Group LLC

(57) ABSTRACT

A static AC submarine power cable configured for at least 72 kV operation including: a power core including: a conductor, an insulation system surrounding the conductor, and a smooth metallic water-blocking sheath surrounding the insulation system, wherein the metallic water-blocking sheath includes stainless steel.

19 Claims, 1 Drawing Sheet

(56) References Cited

U.S. PATENT DOCUMENTS

| | | | |
|---|---|---|---|
| 2011/0005795 A1 | 1/2011 | Deighton et al. | |
| 2011/0048765 A1 | 3/2011 | Eggertsen et al. | |
| 2013/0146350 A1* | 6/2013 | Ku | C21D 9/52 |
| | | | 174/40 R |
| 2014/0166335 A1 | 6/2014 | Kagoura et al. | |
| 2016/0172077 A1* | 6/2016 | Maioli | H01B 7/04 |
| | | | 29/828 |
| 2018/0158570 A1* | 6/2018 | Lee | C09J 5/06 |
| 2019/0198197 A1* | 6/2019 | Henriksen | H01B 7/26 |
| 2019/0250357 A1* | 8/2019 | Li | H01B 7/0018 |
| 2021/0313092 A1* | 10/2021 | Grabinsky | H01B 13/262 |
| 2021/0358656 A1* | 11/2021 | Wilson | H01B 7/1875 |

FOREIGN PATENT DOCUMENTS

| | | |
|---|---|---|
| JP | 09082145 A | 3/1997 |
| JP | 2002117728 A | 4/2002 |
| JP | 2004192831 A | 7/2004 |
| JP | 2011054566 A | 3/2011 |
| JP | 2013045552 A | 3/2013 |
| JP | 2018062227 A | 4/2018 |
| WO | 2014040637 A1 | 3/2014 |

OTHER PUBLICATIONS

Bao, Jie-Qiu, et al.; "Analysis on Submarine Cable Technical Difficulties"; 2017 International Conference on Mechanical Engineering and Control Automation (ICMECA); DEStech Transactions on Engineering and Technology Research; Jul. 7, 2017; 6 Pages.

Extended European Search Report; Application No. 19218059.4; Completed: May 12, 2020; Issued: May 28, 2020; 6 Pages.

International Preliminary Report on Patentability; Application No. PCT/EP2020/087309; Issued: Mar. 9, 2022; 16 Pages.

International Search Report and Written Opinion of the International Searching Authority; Application No. PCT/EP2020/087309; Completed: Mar. 16, 2021; Mailing Date: Mar. 22, 2021; 13 Pages.

Written Opinion of the International Preliminary Examining Authority; Application No. PCT/EP2020/087309; Issued: Nov. 26, 2021; 7 Pages.

European Office Action; Application No. 20 835 815.0; Issued: Jul. 17, 2023; 4 Pages.

Japnese Office Action; Application No. 2022-536483; Completed Nov. 20, 2024; 11 Pages.

Korean Office Action; Application No. 10-2022-7018579; Issued: Mar. 20, 2025; 12 Pages.

\* cited by examiner

AC SUBMARINE POWER CABLE WITH REDUCED LOSSES

TECHNICAL FIELD

The present disclosure generally relates to submarine power cables.

BACKGROUND

Submarine power cables are installed in marine environments. They may for example be arranged on the seabed, be buried under the seabed, or rise from the seabed to an offshore platform. Submarine power cables are configured specifically for use in marine environments to protect them from for example water ingress, from damage from external marine objects such as anchors, and from fatigue damage due to wave motion. They may also be constructed to withstand large tensional forces during installation at larger depths.

Submarine power cables typically comprise one or more power cores. Each power core may comprise a conductor and an insulation system insulating the conductor. Further, each power core may generally have a water-blocking layer to protect the insulation system from water ingress. Traditionally, the water-blocking layer was formed by a lead or lead-alloy layer. More recently, water-blocking layers have been made of aluminium or copper. EP2 706 539 B1, for example, discloses a submarine cable which comprises a water-blocking layer that comprises a copper alloy.

When in operation, induced currents flow in the metallic water-blocking sheath of submarine power cables. Large, induced currents lead to substantial losses in the water-blocking sheath by heating. This influences the permissible current that can be led through the submarine power cable.

Induced currents may comprise two components, namely circulating currents and eddy currents. By using single point grounding of a submarine power cable, the induced currents will consist of only eddy currents. No circulating currents will be present because they will have no path to flow. The cable losses may thus in this case be reduced. Single point grounding may however only be utilised under certain conditions, specifically when the cable length is short.

It would hence be desirable to reduce the losses in a submarine power cable irrespective of the length of the cable.

SUMMARY

An object of the present disclosure is to provide a submarine power cable which solves, or at least mitigates problems of the prior art.

There is hence according to a first aspect of the present disclosure provided an AC submarine power cable comprising: a power core comprising: a conductor, an insulation system surrounding the conductor, and a smooth metallic water-blocking sheath surrounding the insulation system, wherein the metallic water-blocking sheath comprises stainless steel.

It has surprisingly been found by the present inventors that by using stainless steel as material for the water-blocking sheath, the cable losses are reduced substantially. Specifically, the circulating currents in the water-blocking sheath are reduced, leading to the reduced cable losses. Both induced currents and eddy currents are reduced. It was found that this effect was not obtained due to magnetic properties of stainless steel but rather due to the much higher electrical resistance of stainless steel compared to traditional materials such as copper, copper-based alloys, and aluminium.

Due to the lower losses of the submarine power cable, higher currents may be passed through the submarine power cable compared to a similar submarine power cable having a water-blocking sheath made of copper, a copper-based alloy or aluminium. The rating of the submarine power cable may hence be increased. To this end, the current that is passed through the submarine power cable may be increased. The increased current rating may be determined from the following formula from IEC 60287-1-1

$$I = \left( \frac{\Delta\theta - W_d(0.5T_1 + n(T_2 + T_3 + T_4))}{R(T_1 + n(1+\lambda_1)T_2 + n(1+\lambda_1+\lambda_2)(T_3+T_4))} \right)^{0.5}$$

where I is current flowing through one conductor I and $\lambda 1$ is the ratio of losses in the water-blocking sheath to losses in one conductor of the submarine power cable. $\lambda 2$ is the ratio of losses in the armour to the losses in all the conductors, $W_d$ is the dielectric losses for one phase, $T_1$, $T_2$, $T_3$ and $T_4$ are respective thermal resistances of different cable layers and the surrounding medium, $\Delta\theta$ is the temperature difference between conductor and ambient temperature, R is the AC resistance of the conductor, and n is the number of conductors in the cable.

Alternatively, or additionally, due to the lower losses of the submarine power cable, the submarine cable can be redesigned with a reduced conductor cross-section compared to a similar submarine power cable having a water-blocking sheath made of copper, a copper-based alloy or aluminium. This reduction may be deduced from the formula below for submarine power cables without armour wires or with non-magnetic armour.

$$\lambda_1 = \lambda_1' = \frac{R_s}{R} \frac{1}{1 + \left(\frac{R_s}{X}\right)^2}$$

where $\lambda_1 = \lambda'_1$ if eddy current losses, which are smaller than the circulating currents, are ignored, $R_s$ is the resistance of the water-blocking sheath at operating temperature, R is the AC resistance of the conductor, and X is the reactance.

For cables armoured with magnetic armour wires and a water-blocking sheath that is made of lead the formula is multiplied with 1.5 in accordance with § 2.3.10 of IEC 60287-1-1. Although the above factor of 1.5 is for a lead sheath according to IEC 60287-1-1 it is by the present inventors considered to hold also for stainless steel sheaths.

The submarine power cable could hence be made smaller, i.e. it can be constructed with less material.

With the water-blocking sheath being smooth is meant that it is non-corrugated. The smooth metallic water-blocking sheath is hence a non-corrugated metallic water-blocking sheath.

The water-blocking sheath is configured to prevent radial water ingress. The water-blocking sheath is hence a radial water-blocking sheath.

With the term sheath is meant a circumferentially closed structure. The sheath may be a tubular structure or jacket.

The stainless steel may be an austenitic stainless steel.

The water-blocking sheath may be arranged coaxially with the conductor.

The water-blocking sheath may for example have a radial thickness in the range of 0.4-1.25 mm. The present water-blocking sheath may hence be made thinner than aluminium sheaths which typically have a radial thickness in the range of 0.75-3.25 mm and copper sheaths which typically have a radial thickness in the range of 0.5-2.2 mm.

For a submarine power cable with an outer diameter of 60 mm, the thickness t of the metallic water-blocking sheath may for example be in the range of 0.4 mm<t<0.8 mm. For a submarine power cable with an outer diameter of 90 mm, the thickness t of the metallic water-blocking sheath may be in the range of 0.5 mm<t<1.0 mm. For a submarine power cable with an outer diameter of 120 mm, the thickness t of the metallic water-blocking sheath may be in the range of 0.6 mm<t<1.2 mm.

The submarine power cable may be a high voltage power cable. The submarine power cable may for example be configured for 72 kV or higher operation, such as for example 220 kV or higher. The submarine power cable is thus rated for at least 72 kV.

According to one embodiment the metallic water-blocking sheath consists of stainless steel.

According to one embodiment the metallic water-blocking sheath is a welded non-corrugated tube. The water-blocking sheath may for example be made from a stainless-steel sheet that has been folded or wrapped around the insulation system with its facing edges having been welded together. The weld seam may typically extend parallel with the central axis of the conductor. The water-blocking sheath may for example be welded by autogenous welding such as laser welding or resistance welding.

According to one embodiment the stainless steel is SAE 316L. SAE 316L has especially advantageous anti-corrosive properties. Other types of stainless steel could however alternatively be used.

According to one embodiment the submarine power cable is at least 1500 m long, such as at least 2000 m long. For example, the submarine power cable may have a length of at least 1500 m such as at least 2000 m without any joints, either factory joints or rigid joints.

According to one embodiment the submarine power cable is a static submarine power cable. With the term "static submarine power cable" is meant a submarine power cable which is not a dynamic submarine power cable.

One embodiment comprises a semiconductive polymeric sheath surrounding the metallic water-blocking sheath, and a semiconducting adhesive provided on the outer surface of the metallic water-blocking sheath, bonding the metallic water-blocking sheath to the polymeric sheath.

The polymeric sheath may for example be a polyethylene sheath or a polypropylene sheath.

The polymeric sheath is arranged coaxial with the water-blocking sheath.

The semiconductive adhesive may be provided directly on the metallic water-blocking sheath, and in direct contact with the polymeric sheath.

According to one embodiment the polymeric sheath has a thickness which is equal to or greater than (D-6)/24, where D is the outer diameter of the submarine power cable in millimetres. The submarine power cable may thereby be bent by a worst-case scenario bending radius without any visual buckling in the metallic water-blocking sheath.

According to one embodiment the insulation system is a triple layer insulation system comprising an inner semiconducting layer arranged radially outside of the conductor, an insulation layer arranged radially outside of the inner semiconducting layer, and an outer semiconducting layer arranged radially outside of the insulation layer.

The inner semiconducting layer may for example comprise a polymeric material mixed with a semiconducting powder such as carbon black. The polymeric material may for example be polyethylene.

The insulation layer may for example comprise cross-linked polyethylene (XLPE) or polypropylene.

The outer semiconducting layer may for example comprise a polymeric material mixed with a semiconducting powder such as carbon black. The polymeric material may for example be polyethylene.

According to one embodiment the power core is a first power core, and wherein the submarine power cable comprises a second power core and a third power core, each of the second power core and the third power core comprising a respective: conductor, an insulation system surrounding the conductor, and a smooth metallic water-blocking sheath surrounding the insulation system, wherein the metallic water-blocking sheath comprises stainless steel; and wherein the first power core, the second power core and the third power core are stranded.

The water-blocking sheath of the second power core may be arranged coaxially with the conductor of the second power core.

The water-blocking sheath of the second power core is configured to prevent radial water ingress. The water-blocking sheath is hence a radial water-blocking sheath.

The water-blocking sheath of the third power core may be arranged coaxially with the conductor of the third power core.

The water-blocking sheath of the third power core is configured to prevent radial water ingress. The water-blocking sheath is hence a radial water-blocking sheath.

According to one embodiment for each of the second power core and the third power core the metallic water-blocking sheath consists of stainless steel.

One embodiment comprises armour wires forming an armour layer provided around the first power core, the second power core and the third power core, wherein the armour wires are laid helically around the first power core, the second power core and the third power core in the same direction as the stranding direction of said power cores, wherein the armour wires have an armour wire pitch and the first power core, the second power core and the third power core are stranded with a core stranding pitch, wherein the armour wire pitch differs no more than 30% such as no more than 25% from the core stranding pitch.

In case the armour winding pitch differs no more than 30% such as no more than 25% from the core stranding pitch and the armour wires are laid helically in the same direction as the stranding direction of the power cores, a synergistic effect will be obtained in conjunction with the water-blocking sheaths of the power cores, resulting in further reduction of cable losses because magnetic interaction will be reduced as will be explained in the following. The configuration with the pitch differences together with the same lay direction of the armour wires as the stranding direction of the power cores reduces the losses in the armour wires due to reduced eddy current losses. The magnetic field from the conductor induces eddy currents in the armour wires, which in turn generate a magnetic field that induces currents in the water-blocking sheath. The same applies also for the water-blocking sheath, i.e. the circulating currents generate a magnetic field which induces currents in the armour wires. Since the water-blocking sheath of stainless steel reduces circulating currents and the armour wires with the exemplified configuration have reduced eddy currents, these interacting components will further act beneficially together with respect to total cable losses.

One embodiment comprises a semiconductive bedding, wherein the insulation system comprises an inner semiconducting layer arranged radially outside of the conductor, an insulation layer arranged radially outside of the inner semiconducting layer, and an outer semiconducting layer arranged radially outside of the insulation layer, wherein the semiconductive bedding is arranged between the outer semiconducting layer and the metallic water-blocking sheath.

The semiconductive bedding is a moisture barrier.

The semiconductive bedding may comprise a polymeric material such as polyethylene or polypropylene.

The semiconductive bedding may be a semiconductive tape wound around the outer semiconducting layer.

The semiconductive bedding may be a swellable semiconductive bedding.

There is according to a second aspect of the present disclosure provided a method of manufacturing an AC submarine power cable, wherein the method comprises: A) manufacturing a power core, comprising: a1) providing an insulation system around a conductor, and a2) providing a smooth metallic water-blocking sheath comprising stainless steel around the insulation system.

According to one embodiment step a2) involves folding a stainless-steel sheet around the insulation system and welding the facing edges of the stainless-steel sheet to form the metallic water-blocking sheath.

According to one embodiment the metallic water-blocking sheath consists of stainless steel.

According to one embodiment the power core is a first power core and wherein the method comprises: B) manufacturing a second power core and a third power core, wherein for each power core the method comprises: b1) providing an insulation system around a conductor, b2) providing a smooth metallic water-blocking sheath comprising stainless steel around the insulation system; and wherein the method comprises assembling the first power core, the second power core and the third power core by stranding.

One or more layers of armour wires may be provided around the three stranded power cores. The armour wires may be arranged helically around the three stranded power cores. The armour wires may be made of metal such as steel, e.g. galvanised steel or stainless steel, aluminium or copper, or by a non-metallic material such as a polymeric material. Alternatively, the set of armour wires may comprise both metallic and non-metallic armour wires.

According to one embodiment the method comprises providing an outer serving radially outside of the stranded power cores and in case an armour layer is present, providing the outer serving radially outside the one or more layers of armour wires.

Generally, all terms used in the claims are to be interpreted according to their ordinary meaning in the technical field, unless explicitly defined otherwise herein. All references to "a/an/the element, apparatus, component, means, etc." are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
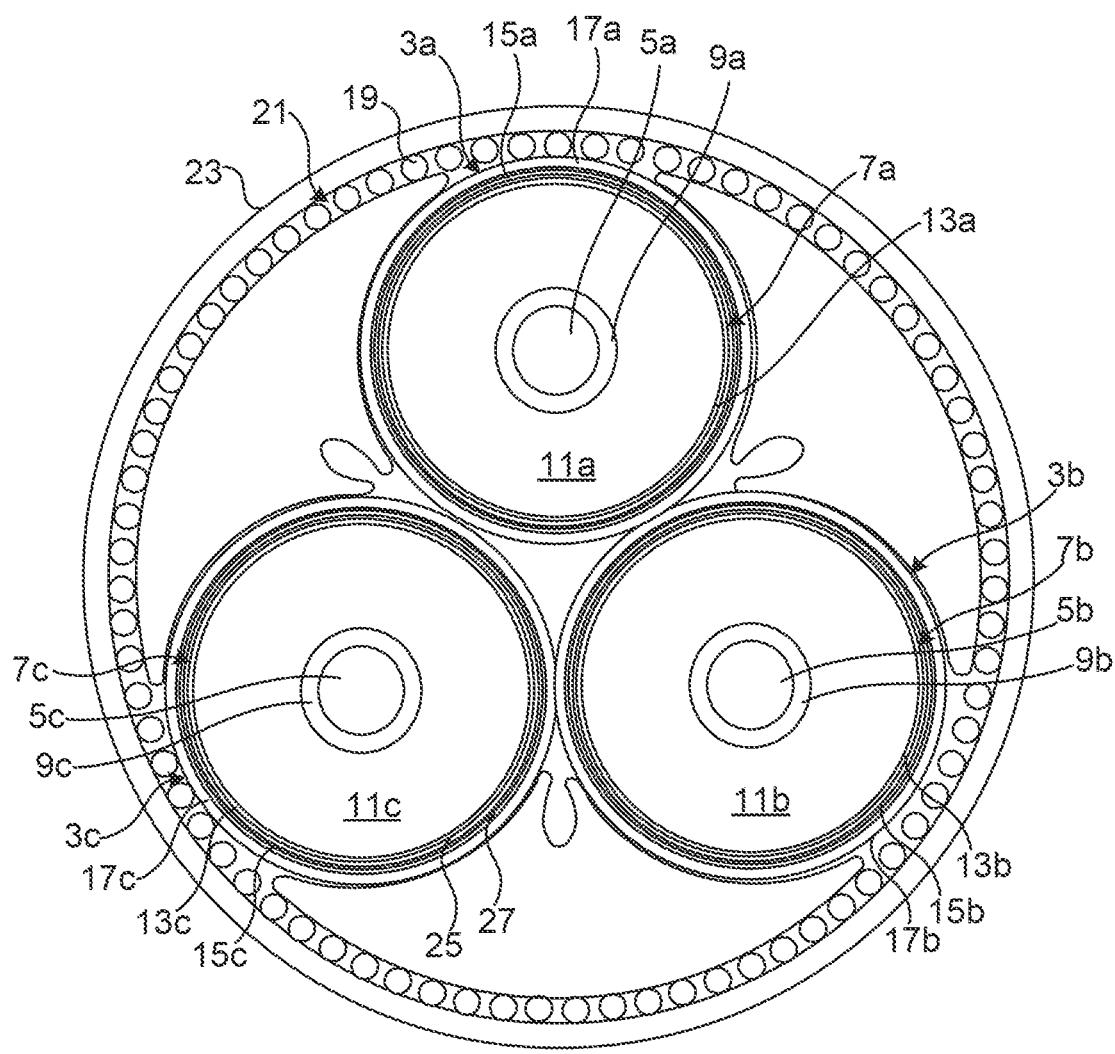
FIG. 1 schematically shows a cross-sectional view of one example of a submarine power cable.

FIG. 1 shows a cross-section of an example of an AC submarine power cable 1. The AC submarine power cable 1 comprises three power cores 3a, 3b, and 3b. Alternatively, the AC submarine power cable could comprise less than three power cores, for example a single power core.

The submarine power cable 1 may be a dynamic submarine power cable or a static submarine power cable. Preferably, the submarine power cable 1 is a static submarine power cable.

The power cores, namely the first power core 3a, the second power core 3b and the third power core 3c are arranged in a stranded configuration. Each of the three power cores 3a, 3b and 3c has a core stranding pitch. The core stranding pitch is the same for all three power cores 3a, 3b, 3c.

The first power core 3a comprises a conductor 5a. The conductor 5a is arranged centrally in the first power core 3a. The conductor 5a may for example be made of copper or aluminium. The conductor 5a may for example be stranded, compacted, of Milliken type, or solid.

According to the example, the first power core 3a comprises an insulation system 7a arranged around the conductor 5a. The insulation system 7a is arranged coaxially with the conductor 5a. The insulation system 7a comprises an inner semiconducting layer 9a arranged radially outside of the conductor 5a, an insulation layer 11a arranged radially outside of the inner semiconducting layer 9a, and an outer semiconducting layer 13a arranged radially outside of the insulation layer 11a. The insulation system 7a is hence a triple layer insulation system.

The inner semiconducting layer 9a acts as a conductor screen. The outer semiconducting layer 13a acts as an insulation layer screen.

The first power core 3a comprises a metallic water-blocking sheath 15a. The water-blocking sheath 15a surrounds the insulation system 7a. The water-blocking sheath 15a is smooth. The water-blocking sheath 15a hence has no corrugations, i.e. the water-blocking sheath 15a is non-corrugated. The water-blocking sheath 15a is arranged radially outside of the insulation system 7a. The water-blocking sheath 15a is coaxial with the insulation system 7a and with the conductor 5a. The water-blocking sheath 15a comprises stainless steel. For example, the water-blocking sheath 15a may consist of stainless steel. The stainless steel may for example be stainless steel SAE 316L.

The first power core 3a may comprise a semiconductive bedding 25 arranged between the insulation system 7a and the metallic water-blocking sheath 15a.

The first power core 3a may comprise a semiconductive polymeric sheath 17a surrounding the water-blocking sheath 15a. The polymeric sheath 17a is arranged coaxially with the water-blocking sheath 15a. The polymeric sheath 17a may for example comprise polyethylene or polypropylene. Further, the first power core 3a comprises a semiconducting adhesive 27 configured to bond the polymeric sheath 17a to the water-blocking sheath 15a. The semiconducting adhesive may hence be provided on the outer surface of the water-blocking sheath 15a and on the inner surface of the polymeric sheath 17a such that the polymeric sheath 17a adheres to the outer surface of the water-blocking sheath 15a. The semiconducting adhesive may for example comprise carbon black.

The second power core 3b comprises a conductor 5b. The conductor 5b is arranged centrally in the second power core 3b. The conductor 5b may for example be made of copper or aluminium. The conductor 5b may for example be stranded, compacted, of Milliken type, or solid.

According to the example, the second power core 3b comprises an insulation system 7b arranged around the conductor 5b. The insulation system 7b is arranged coaxially with the conductor 5b. The insulation system 7b comprises an inner semiconducting layer 9b arranged radially outside of the conductor 5b, an insulation layer 11b arranged radially outside of the inner semiconducting layer 9b, and an outer semiconducting layer 13b arranged radially outside of the insulation layer 11b. The insulation system 7b is hence a triple layer insulation system.

The inner semiconducting layer 9b acts as a conductor screen. The outer semiconducting layer 13b acts as an insulation layer screen.

The second power core 3b comprises a metallic water-blocking sheath 15b. The water-blocking sheath 15b surrounds the insulation system 7b. The water-blocking sheath 15b is smooth. The water-blocking sheath 15b hence has no corrugations, i.e. the water-blocking sheath 15b is non-corrugated. The water-blocking sheath 15b is arranged radially outside of the insulation system 7b. The water-blocking sheath 15b is coaxial with the insulation system 7b and with the conductor 5b. The water-blocking sheath 15b comprises stainless steel. For example, the water-blocking sheath 15b may consist of stainless steel. The stainless steel may for example be stainless steel SAE 316L.

The second power core 3b may comprise a semiconductive bedding 25 arranged between the insulation system 7b and the metallic water-blocking sheath 15b.

The second power core 3b may comprise a semiconductive polymeric sheath 17b surrounding the water-blocking sheath 15b. The polymeric sheath 17b is arranged coaxially with the water-blocking sheath 15b. The polymeric sheath 17b may for example comprise polyethylene or polypropylene. Further, the second power core 3b comprises a semiconducting adhesive 27 configured to bond the polymeric sheath 17b to the water-blocking sheath 15b. The semiconducting adhesive may hence be provided on the outer surface of the water-blocking sheath 15b and on the inner surface of the polymeric sheath 17b such that the polymeric sheath 17b adheres to the outer surface of the water-blocking sheath 15b. The semiconducting adhesive may for example comprise carbon black.

The third power core 3c comprises a conductor 5c. The conductor 5c a is arranged centrally in the third power core 3c. The conductor 5c may for example be made of copper or aluminium. The conductor 5c may for example be stranded, compacted, of Milliken type, or solid.

According to the example, the third power core 3c comprises an insulation system 7c arranged around the conductor 5c. The insulation system 7c is arranged coaxially with the conductor 5c. The insulation system 7c comprises an inner semiconducting layer 9c arranged radially outside of the conductor 5c, an insulation layer 11c arranged radially outside of the inner semiconducting layer 9c, and an outer semiconducting layer 13c arranged radially outside of the insulation layer 11c. The insulation system 7c is hence a triple layer insulation system.

The inner semiconducting layer 9c acts as a conductor screen. The outer semiconducting layer 13c acts as an insulation layer screen.

The third power core 3c comprises a metallic water-blocking sheath 15c. The water-blocking sheath 15c surrounds the insulation system 7c. The water-blocking sheath 15c is smooth. The water-blocking sheath 15c hence has no corrugations, i.e. the water-blocking sheath 15c is non-corrugated. The water-blocking sheath 15c is arranged radially outside of the insulation system 7c. The water-blocking sheath 15c is coaxial with the insulation system 7c and with the conductor 5c. The water-blocking sheath 15c comprises stainless steel. For example, the water-blocking sheath 15c may consist of stainless steel. The stainless steel may for example be stainless steel SAE 316L.

The third power core 3c may comprise a semiconductive bedding 25 arranged between the insulation system 7c and the metallic water-blocking sheath 15c.

The third power core 3c may comprise a semiconductive polymeric sheath 17c surrounding the water-blocking sheath 15c. The polymeric sheath 17c is arranged coaxially with the water-blocking sheath 15c. The polymeric sheath 17c may for example comprise polyethylene or polypropylene. Further, the third power core 3c comprises a semiconducting adhesive 27 configured to bond the polymeric sheath 17c to the water-blocking sheath 15c. The semiconducting adhesive may hence be provided on the outer surface of the water-blocking sheath 15c and on the inner surface of the polymeric sheath 17c such that the polymeric sheath 17c adheres to the outer surface of the water-blocking sheath 15c. The semiconducting adhesive may for example comprise carbon black.

The submarine power cable 1 may comprise a plurality of armour wires 19 forming an armour layer 21. The armour wires 19 may be provided radially outside of the three stranded power cores 3a, 3b, and 3c in case of three power cores, or radially outside the single power core in case the submarine power cable comprises a single power core.

The armour wires 19 may be arranged helically around the one or more power cores 3a-3c. In this case, the armour wires 19 have an armour wire pitch. According to one example, the armour wire pitch differs no more than 30% such as no more than 25% from the core stranding pitch of the stranded power cores 3a, 3b and 3c. According to one example, the armour wires 19 may be laid helically with the same lay direction as the stranding direction of the power cores 3a-3c. Alternatively, the armour wires 19 may be laid helically in the opposite direction relative to the standing direction of the power cores 3a-3c. With the terms "lay direction" and "stranding direction" is here meant "left" or "right" lay, and not any specific helix angle. With "opposite direction" is thus not meant a specific helix angle but merely that if e.g., the armour wires are laid with a left helical lay then the stranded power cores are laid with a right lay.

The submarine power cable 1 comprises an outer serving 23 arranged around the one or more armour layers 21. The outer serving 23 may for example comprise polymeric yarn such as polypropylene yarn, arranged helically around the armour layer 21.

There may be additional layers in the submarine power cable 1, not disclosed herein.

Figure 2:
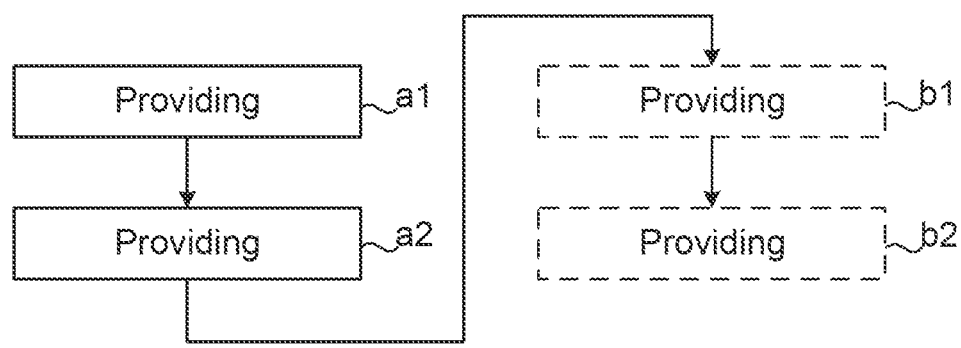
FIG. 2 is a flowchart of a method of manufacturing the submarine power cable in FIG. 1.

FIG. 2 shows a flowchart of a method of manufacturing the submarine power cable 1.

In a step a1) the insulation system 7a is provided around the conductor 5a. The insulation system 7a may for example be provided around the conductor 5a by means of triple extrusion.

In a step a2) the water-blocking sheath 15a is provided around the insulation system 7a.

Step a2) may involve folding or wrapping a stainless-steel sheet around the insulation system 7a and welding the opposing edges of the stainless-steel sheet longitudinally along the length of the power core 3a. The stainless-steel sheet will thereby form a welded tube. The welding may be made by autogenous welding.

In case the submarine power cable comprises more than one power core, such as in the example in FIG. 1, each power core 3a-3c is made in a similar or identical way. Thus, the method may comprise steps b1) corresponding to step a1), for each additional power core 3b and 3c, and step b2) corresponding to step a2), for each power core 3b and 3c. In this case, the three power cores 3a-3c are assembled by stranding.

After the power cores 3a-3c have been assembled, the submarine power cable 1 may be moved through an armouring line for providing the armour wires 19 in the form of an armour layer 21 around the assembled power cores 3a-3c.

The outer serving 23 may be provided around the armour layer 21 after the submarine power cable 1 has been moved through the armouring line or simultaneously with being moved through the armouring line.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A static AC submarine power cable configured for at least 72 kV operation, comprising:
   a power core comprising:
      a conductor,
      an insulation system surrounding the conductor, the insulation system comprising an inner semiconducting layer arranged radially outside of the conductor, an insulation layer arranged radially outside of the inner semiconducting layer, and an outer semiconducting layer arranged radially outside of the insulation layer,
      a smooth metallic water-blocking sheath surrounding the insulation system, the metallic water-blocking sheath comprising austenitic stainless steel, the metallic water-blocking sheath being made from an austenitic stainless-steel sheet that is folded or wrapped around the insulation system and that has facing edges which are welded together,
      a swellable semiconductive bedding which is a moisture barrier, the semiconductive beddinq being a semiconductive tape wound around the outer semiconducting layer and arranged between the outer semiconducting layer and the metallic water-blocking sheath, and
      a semiconducting polymeric sheath surrounding the metallic water-blocking sheath,
   a plurality of armour wires forming an armour layer around the power core, and
   an outer serving arranged around the armour layer.

2. The submarine power cable as claimed in claim 1, wherein the metallic water-blocking sheath consists of austenitic stainless steel.

3. The submarine power cable as claimed in claim 1, wherein the metallic water-blocking sheath is a welded non-corrugated tube.

4. The submarine power cable as claimed in claim 1, wherein the austenitic stainless steel is SAE 316L.

5. The submarine power cable as claimed in claim 1, wherein the submarine power cable is at least 1500 m long.

6. The submarine power cable as claimed in claim 1, comprising a semiconducting adhesive provided on the outer surface of the metallic water-blocking sheath, bonding the metallic water-blocking sheath to the polymeric sheath.

7. The submarine power cable as claimed in claim 6, wherein the polymeric sheath has a thickness which is equal to or greater than (D-6)/24,
   where D is the outer diameter of the submarine power cable in millimetres.

8. The submarine power cable as claimed in claim 1, wherein the power core is a first power core, and wherein the submarine power cable comprises a second power core and a third power core, each of the second power core and the third power core including a respective:
   conductor,
   an insulation system surrounding the conductor, and
   a smooth metallic water-blocking sheath surrounding the insulation system,
   wherein the metallic water-blocking sheath comprises austenitic stainless steel;
and
   wherein the first power core, the second power core and the third power core are stranded.

9. The submarine power cable as claimed in claim 8, wherein for each of the second power core and the third power core the metallic water-blocking sheath consists of austenitic stainless steel.

10. The submarine power cable as claimed in claim 8, wherein the plurality of armour wires are arranged around the first power core, the second power core and the third power core, wherein the armour wires are laid helically around the first power core, the second power core and the third power core in the same direction as the stranding direction of said power cores, wherein the armour wires have an armour wire pitch and the first power core, the second power core and the third power core are stranded with a core stranding pitch, wherein the armour wire pitch differs no more than 30% from the core stranding pitch.

11. The submarine power cable as claimed in claim 1, wherein the semiconductive tape is arranged directly between the outer semiconducting layer and the metallic water-blocking sheath.

12. The submarine power cable as claimed in claim 11, wherein the radial thickness of the metallic water-blocking sheath is in a range of 0.4-0.8 mm for the submarine power cable having an outer diameter of 60 mm.

13. The submarine power cable as claimed in claim 11, wherein the radial thickness of the metallic water-blocking sheath is in a range of 0.5-1.0 mm for the submarine power cable having an outer diameter of 90 mm.

14. The submarine power cable as claimed in claim 11, wherein the radial thickness of the metallic water-blocking sheath is in a range of 0.6-1.2 mm for the submarine power cable having an outer diameter of 120 mm.

15. The submarine power cable as claimed in claim 1, wherein the metallic water-blocking sheath has a radial thickness in a range of 0.4-1.25 mm.

16. A method of manufacturing a static AC submarine power cable configured for at least 72 kV operation, wherein the method comprises:
  manufacturing a power core, which comprises:
    providing an insulation system around a conductor, the insulation system comprising an inner semiconducting layer arranged radially outside of the conductor, an insulation layer arranged radially outside of the inner semiconducting layer, and an outer semiconducting layer arranged radially outside of the insulation layer,
    applying a swellable semiconductive bedding which is a moisture barrier,
  the semiconductive bedding being a semiconductive tape wound around the outer semiconducting layer,
    providing a smooth metallic water-blocking sheath including austenitic stainless steel around the insulation system and the semiconductive bedding, wherein the step of providing the smooth metallic water-blocking sheath involves folding an austenitic stainless-steel sheet around the insulation system and welding facing edges of the austenitic stainless-steel sheet to form the metallic water-blocking sheath, and
    surrounding the metallic water blocking sheath with a semiconductive polymeric sheath:
  forming an armour layer around the power core, the armour layer comprising a plurality of armour wires; and
  arranging an outer serving around the armour layer.

17. The method as claimed in claim 16, wherein the metallic water-blocking sheath consists of austenitic stainless steel.

18. The method as claimed in claim 16, wherein the power core is a first power core and wherein the method comprises:
  manufacturing a second power core and a third power core, wherein for each of the second power core and the third power core, the method comprises:
    providing an insulation system around a conductor,
    providing a smooth metallic water-blocking sheath including austenitic stainless steel around the insulation system; and
  wherein the method comprises assembling the first power core, the second power core and the third power core by stranding.

19. A static AC submarine power cable configured for at least 72 KV operation, comprising:
  a plurality of power cores, each power core comprising:
    a conductor,
    an insulation system surrounding the conductor, the insulation system including an inner semiconducting layer arranged radially outside of the conductor, an insulation layer arranged radially outside of the inner semiconducting layer, and an outer semiconducting layer arranged radially outside of the insulation layer,
    a smooth metallic water-blocking sheath surrounding the insulation system, the metallic water-blocking sheath comprising austenitic stainless steel,
    the metallic water-blocking sheath being made from an austenitic stainless-steel sheet that is folded or wrapped around the insulation system and that has facing edges which are welded together,
    a swellable semiconductive bedding arranged coaxially with the conductor between the outer semiconducting layer and the metallic water-blocking sheath,
    the swellable semiconductive bedding being a moisture barrier in the form of a semiconductive tape wound around the outer semiconducting layer, and
    a semiconductive polymeric sheath surrounding the metallic water-blocking sheath;
  an armour layer arranged radially outside of all swellable semiconductive beddings of the power cores, the armour layer comprising a plurality of armour wires arranged helically around the power cores; and
  an outer serving arranged around the armour layer.

* * * * *